March 29, 1927.

J. BING

ELECTROMAGNETIC FRICTION CLUTCH

Filed Dec. 16, 1924

1,622,939

Inventor:
Julius Bing.
By Harold O. Penner
Atty.

Patented Mar. 29, 1927.

1,622,939

UNITED STATES PATENT OFFICE.

JULIUS BING, OF EISENACH, GERMANY, ASSIGNOR TO THE FIRM MAGNET-WERK G. M. B. H. EISENACH, SPEZIALFABRIK FÜR ELEKTROMAGNET-APPARATE, OF EISENACH, THURINGIA, GERMANY.

ELECTROMAGNETIC FRICTION CLUTCH.

Application filed December 16, 1924, Serial No. 756,258, and in Germany December 17, 1923.

My invention relates to improvements in electromagnetic friction clutches, and the object of the improvements is to provide a clutch in which the clutch members are thrown into frictional engagement without shocks, which are adapted to transmit high power, which are simple in operation and may be manufactured at low cost, and in which the weight of the operative parts and the space required therefor are small as compared to the power transmitted thereby. With these objects in view my invention consists in the arrangement, construction and combination of parts described hereinafter and particularly set forth in the appended claims.

In the drawing showing a preferred example of the invention—

Figure 1:
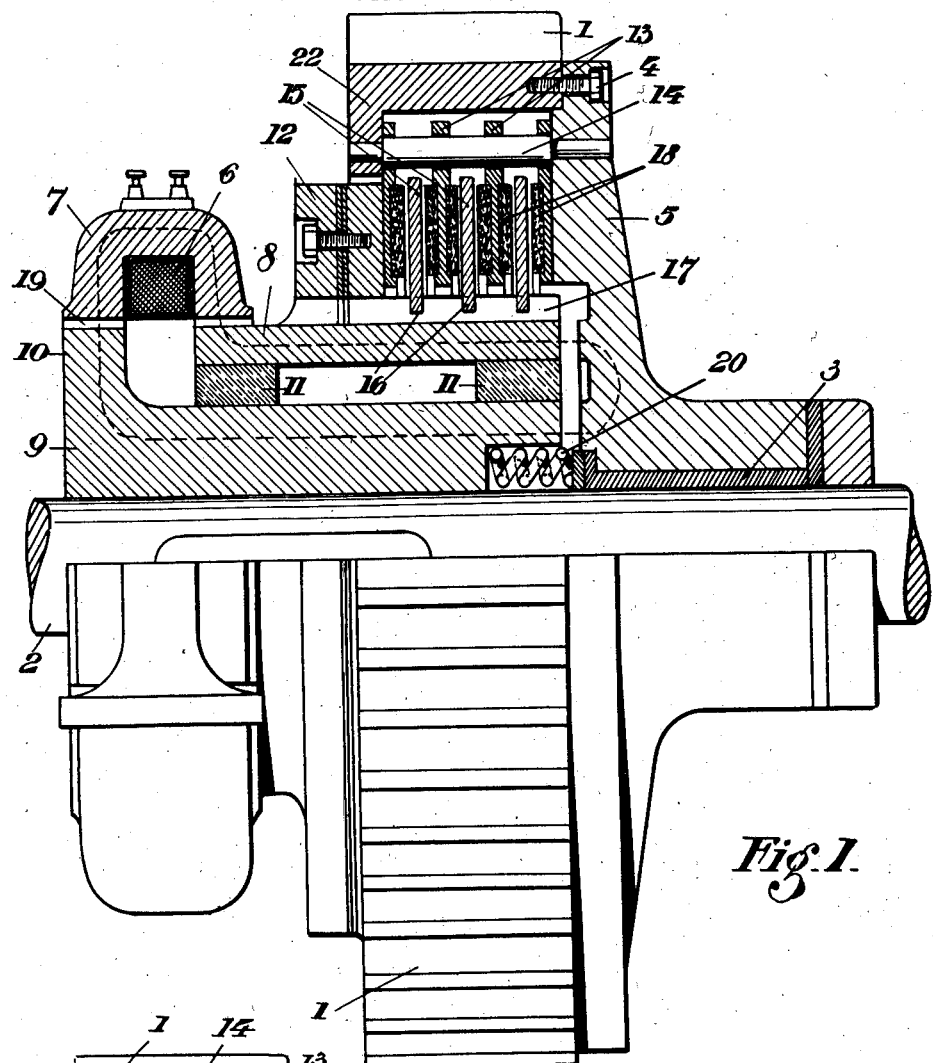
Fig. 1 is an elevation of the clutch partly in section.

In Fig. 1 I have shown a clutch in which one of the clutch members is provided by a gear wheel 1, which may be understood to be the driving member, and the other clutch member is provided by a shaft 2 on which the gear wheel is rotatably mounted through the intermediary of a bushing 3 capable of rotary and axial movement on the shaft 2. The rim of the gear wheel is secured by means of screws 4 to the web 5, the hub of which carries the bushing 3. The web and its hub are made from magnetizable material, and they provide the armature of a coupling electromagnet. The said electromagnet consists of a relatively fixed annular casing 7 enclosing an exciting coil 6, and two yokes 8 and 9 transmitting the magnetic flux from the casing 7 to the armature 5. As shown the said yokes are in the form of two concentric cylinders spaced and rigidly secured to each other by rings 11 of non-magnetic material, and they are made from magnetic iron. At its outer end the inner yoke 9 is formed with a flange 10. The yoke 8 carries a flange 12 which however, is disposed a certain distance away from the casing 7, and which provides an abutment for the friction members of the clutch.

The said friction members are arranged in two sets. The friction rings 13 of one of the sets are placed on bolts 14 secured to the web 5 and the flange 22 of the rim 1 of the gear wheel. The friction rings 15 of the other set are internally formed with radial lugs or noses 16 engaging in axial slots 17 made in the outer face of the yoke 8, so that the said friction rings are axially shiftable but non-rotatable on the yoke 8. The friction rings of both sets are in the form of annular disks.

In the example shown in Fig. 1, the friction rings of both sets are made from metal, such as steel, and annular disks or segments 18 of a material of a high coefficient of friction are disposed between the metallic friction rings. As shown the said disks or segments 18 are embedded in annular seats of the rings 13 and they are secured thereto in a suitable way, for example by means of rivets. As appears from Fig. 1, such friction linings are provided on either side of all the friction rings 13. It will be understood that the linings 18 may also be secured to the friction rings 15.

Figure 2:
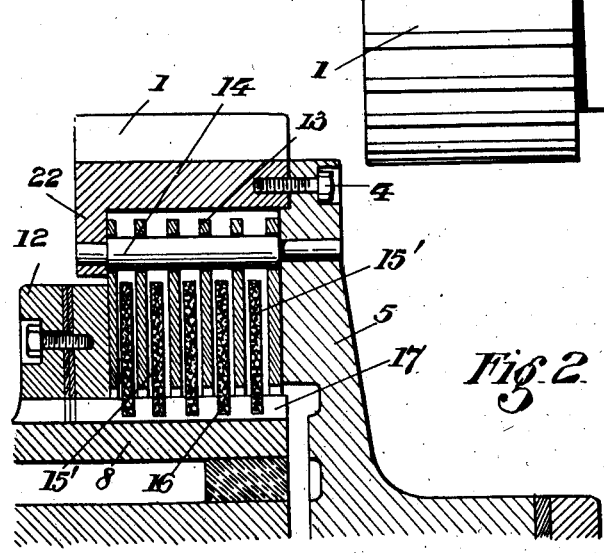
Fig. 2 is a partial sectional elevation showing a modification.

In the modification shown in Fig. 2, the friction rings 13 consist of annular steel disks, and the friction rings 15′ are made from the said material of high coefficient of friction. In this case the said friction rings 15′ may be connected with the yoke 8 in the same way as has been described with reference to the friction rings 15.

The operation of the clutch is as follows: It may be assumed that the shaft 2 is the driven member, and that it is desired to couple thereto the gear wheel 1. The attendant closes the circuit of the exciting coil 6 thus producing a magnetic flux passing through the gap 19 between the body 7 and the yokes 8 and 9 and the said yokes, so that magnetic poles are produced at the right hand ends of the said yokes. Therefore, the axially shiftable web 5 providing the armature of the magnet is attracted in opposition to a spring 20, and the friction rings 13 and 15 are brought into frictional engagement with each other, the power depending on and being regulatable by the strength of the exciting current. The friction between the friction rings 13 and 15 is gradually increased, thus gradually imparting rotary movement to the shaft 2. After the full current has been admitted to the exciting coil the maximum power can be transmitted through the clutch, and the shaft 2 is rotated without slip.

A preferred material for the manufacture of the friction rings 15' and the lining 18 consists of an impregnated fabric known in the trade as "Ferodo". But I wish it to be understood that my invention is not limited to the use of the said material. A suitable material consists of a fabric of cotton, asbestos, brass wire or other wire impregnated with resinous matter, lacquer, bakelite, and the like, which fabric is impregnated with the said matter under pressure and at elevated temperature for producing a body which as to rigidity and strength is similar to wood.

When providing the friction rings with a lining of the character indicated the number of the friction rings provided in a given space may be very large, and the surface area of the friction members required for a certain power is comparatively small in view of the high coefficient of friction. Therefore, the space required for the clutch is small as compared to the power. Further, the radial dimension of the clutch is small, because the coil 6 and the magnetic body 7 are disposed laterally of the clutch. Another important feature of my improved construction resides in the fact that the magnet 7 and the coil 6 do not take part in the rotary movement of the clutch so that they are not subject to centrifugal action.

While in describing the invention reference has been made to particular examples embodying the same I wish it to be understood that my invention is not limited to the constructions shown in the drawing, and that various changes may be made in the general arrangement of the apparatus and the construction of its parts without departing from the invention.

I claim:

1. An electromagnetic clutch, comprising a rotary pressure member, and a coaxial rotary abutment member mounted shiftable relatively to each other, two sets of interengaging friction members disposed between said pressure and abutment members and operatively connected respectively therewith for being axially shiftable and non-rotatable thereon, electromagnetic means adapted to shift said pressure and abutment members towards each other and to throw said sets of friction members into frictional engagement with each other, said electromagnetic means comprising two concentric hollow cylindrical bodies of magnetic material and partly surrounded by said friction members and rotatable with and abutment member, a ring shaped non-rotatable magnet axially spaced from said friction members and surrounding said cylindrical bodies and having an inner diameter somewhat larger than the outer diameter of both said cylindrical bodies, and an electrical coil adapted to excite said magnet.

2. An electromagnetic clutch, comprising a rotary pressure member, and a coaxial rotary abutment member shiftable relatively to each other, two sets of interengaging friction members disposed between said pressure and abutment members and operatively connected respectively therewith, and electromagnetic means adapted to shift said pressure and abutment members towards each other and to throw said sets of friction members into frictional engagement with each other, said electromagnetic means comprising two magnetic yokes substantially cylindric in form and both partly surrounded by said friction members, a non-rotatable magnet axially spaced from said friction members, and an electric coil adapted to excite said magnet.

3. An electromagnetic clutch, comprising a rotary pressure member, and a coaxial rotary abutment member shiftable relatively to each other, two sets of interengaging friction members disposed between said pressure and abutment members and operatively connected respectively therewith for being axially shiftable and non-rotatable thereon, and electromagnetic means adapted to shift said pressure and abutment members towards each other and to throw said sets of friction members into frictional engagement with each other, said electromagnetic means comprising two concentric magnetic yokes substantially cylindric in form and partly surrounded by said friction members and abutment member and rotatable with said abutment member, a non-rotatable magnet axially spaced from said friction members, and an electric coil adapted to excite said magnet.

4. An electromagnetic clutch, comprising a rotary pressure member, and a coaxial rotary abutment member mounted shiftable relatively to each other, two sets of interengaging friction members disposed between said pressure and abutment members and operatively connected respectively therewith for being axially shiftable and non-rotatable thereon, and electromagnetic means adapted to shift said pressure and abutment members towards each other and to throw said sets of friction members into frictional engagement with each other, said electromgnetic means comprising two concentric magnetic yokes substantially cylindric in form and partly surrounded by said friction members and abutment member and rotatable with said abutment member, a ring shaped non-rotatable magnet axially spaced from said friction members and surrounding said yokes and having an inner diameter substantially equal to the inner diameter of said friction members, and an electric coil adapted to excite said magnet.

5. An electromagnetic clutch, comprising a rotary pressure member, a coaxial rotary abutment member, two sets of interengaging friction rings between said members adapted to be shifted thereby into frictional engagement, the rings of one set being made from metal and the rings of the other set from a material of high coefficient of friction, electromagnetic means for shifting said pressure and abutment members towards each other and comprising two substantially cylindric yokes of magnetic material, both yokes partly disposed within said friction rings, a stationary body of magnetic material axially spaced from said sets of rings, and an electric coil adapted to magnetize said body and yokes.

6. An electromagnetic clutch, comprising a rotary pressure member, a coaxial rotary abutment member, two sets of interengaging friction rings between said members adapted to be shifted thereby into frictional engagement, the rings of one set being made from metal and the rings of the other set from impregnated and hardened fibre material, electromagnetic means for shifting said pressure and abutment members towards each other and comprising two concentric hollow cylindric yokes of magnetic material partly disposed within said friction rings and rotatable with said abutment member, a stationary body of magnetic material axially spaced from said sets of rings, and an electric coil adapted to magnetize said body and yokes.

7. An electromagnetic clutch, comprising a rotary pressure member, a coaxial rotary abutment member, two sets of interengaging friction rings between said members adapted to be shifted thereby into frictional engagement, said abutment member comprising two concentric hollow cylinders of iron disposed within said friction rings and axially projecting out of said rings, a stationary annular body of magnetic material around the projecting parts of said cylinders, and an exciting coil acting on said body.

In testimony whereof I affix my signature.

JULIUS BING.